United States Patent [19]

Brown

[11] 4,161,338
[45] Jul. 17, 1979

[54] PICKUP TRUCK HOIST ATTACHMENT
[75] Inventor: Henry C. Brown, Dallas, Tex.
[73] Assignee: The Uni Corporation, Dallas, Tex.
[21] Appl. No.: 848,110
[22] Filed: Nov. 3, 1977
[51] Int. Cl.² ............................................. B60P 1/16
[52] U.S. Cl. ................................... 298/22 J; 254/124
[58] Field of Search .................. 298/1 A, 22 R, 22 D, 298/22 J, 10, 17 R; 214/501; 254/124

[56] References Cited
U.S. PATENT DOCUMENTS

| 2,226,213 | 12/1940 | Wood | 298/22 J |
|---|---|---|---|
| 3,784,162 | 1/1974 | Channell | 298/22 J X |
| 4,066,296 | 1/1978 | Ray et al. | 298/22 J |

Primary Examiner—L. J. Paperner
Attorney, Agent, or Firm—Arthur M. Sloan

[57] ABSTRACT

A scissor hoist attachment for pickup truck beds to convert a fixed bed truck with a passenger cab and hauling bed supported on a frame to a tilting bed truck. The hoist upon installation allows the truck bed to be rotated from a horizontal to a tilt position so that the truck cab and bed are in the same relative relationship in the horizontal position as before the installation of the hoist, i.e. the hoist does not alter the original body lines of the truck. The hoist is a four bar linkage. The yoke utilizes one cylinder to operate a scissors of wide pivotal area but narrow at its mountings. The wide pivotal area permits use of the space around the truck differential since the scissors side plates and spreader plate straddle the truck differential and permit a heavier payload to be lifted. The wide pivotal area enables the hoist to be used with essentially all standard pickup trucks and makes the hoist effectively universal. The hoist is a total bolt on unit requiring no welding and facilitating installation and removal for installation on other trucks. The hoist is designed to be extremely rigid and resistant to twisting forces resulting from unbalanced loading of the tilting bed.

5 Claims, 3 Drawing Figures

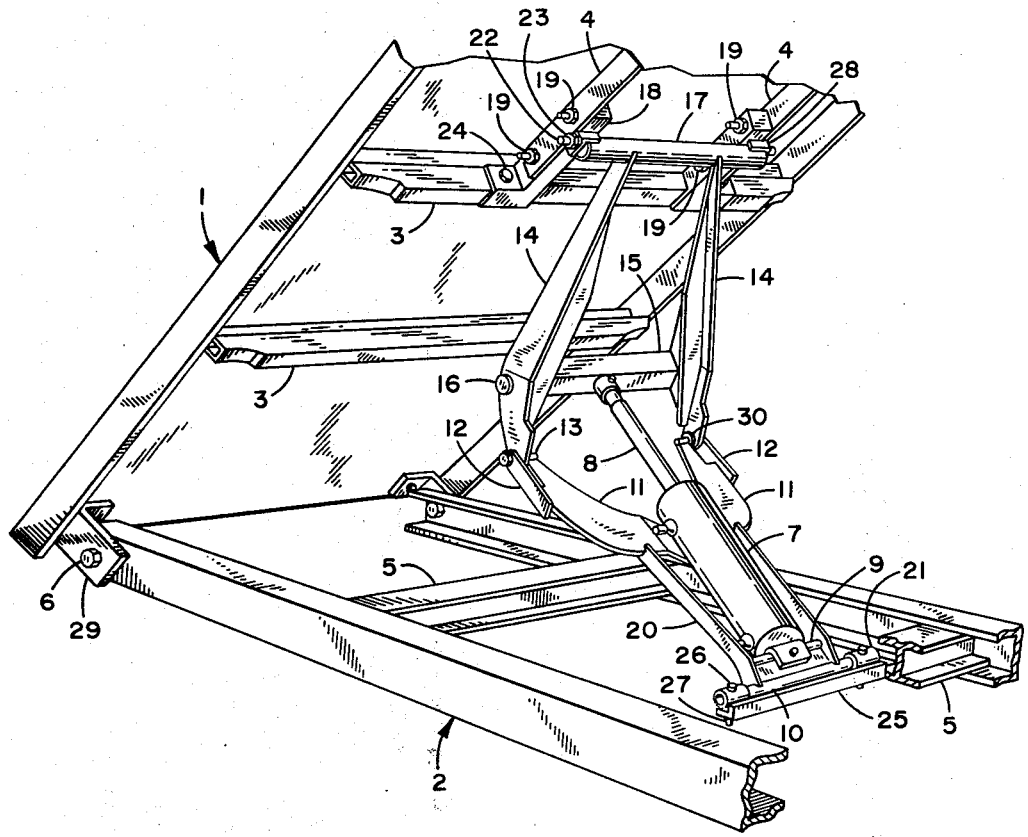

PICKUP TRUCK HOIST ATTACHMENT

This invention relates to a device for converting a standard fixed bed pickup truck to a tilting bed truck. More specifically this invention relates to a scissor hoist adapted for attachment to a pickup truck bed to convert the truck to a tilting bed truck.

Prior art devices utilize generally rectangular frame members having side plates narrowly spaced at the pivotal connection between the top frame and the bottom frame. As a result of the narrow spacing of the side plates of prior art devices at the pivot points, it is necessary to have different models of hoist attachment for different model trucks to avoid contact with the truck differential, or the truck bed when retracted does not lie flat because of interference with the truck differential, or the hoist has to be mounted to open towards the back of the truck rather than towards the cab or front of the truck thus severely limiting the angle to which the truck bed may be raised. The present invention with its wide spacing between the top frame side members and bottom frame side members at the points of pivotal connection when mounted to open towards the back of the truck enables the side members to straddle the truck differentials of substantially all models of pickup truck in current use since the 1973 models and also helps to miss the exhaust and muffler on some makes of pickup truck thus providing a substantially universal hoist attachment which allows maximum lifting and tilting of the truck bed while maintaining original body lines when the bed is in horizontal position.

Also most prior art devices currently on the market utilize coupling members between the top and bottom frames thus providing five bar linkages with considerable slack which permits the truck bed to be raised to as much as twenty degrees without power being applied thus preventing a trailer from being towed by a pickup truck with a fifth link hoist as the weight of the trailer on the tongue can raise the bed up to twenty degrees. The present invention provides a four bar linkage with very little manufacturing slack and requires power to raise the bed beyond manufacturing slack and when utilized in a pickup truck, the pickup truck can tow a trailer since the weight of the trailer on the tongue can raise the bed only one or two degrees.

Despite the wide space between the side elements of the top and bottom frames at the points of pivotal connection, the present invention requires only one cylinder for lifting the truck bed.

As contrasted with some prior art devices, the hoist attachment of the present invention can be readily assembled and disassembled by means of nuts and bolts and does not require welding which normally prevents a hoist attachment from being easily and effectively removed without damage to the truck.

Accordingly, an object of the subject invention is to provide an improved scissor hoist attachment for a pickup truck that will fit most pickup trucks without modification of the truck or the hoist attachment, without interference with the truck differential, and without altering the original body lines of the truck.

Another object of the subject invention is to provide an improved scissor hoist attachment for a pickup truck that is easily and easily installed without welding and removeable without damage to the pickkup truck from which it has been removed or to the hoist attachment and readily and easily reinstalled without welding in a different pickup truck.

Still another object of the subject invention is to provide an improved scissor hoist attachment for a pickup truck in which the pickup truck bed when retracted lies flat on the truck frame without altering the appearance of the pickup truck.

Yet another object of the subject invention is to provide an improved scissor hoist attachment for a pickup truck utilizing a true four bar linkage which prevents the bed from being raised more one or two degrees without power and thus makes it suitable for use on a pickup truck which is to tow a trailer.

A further object of the subject invention is to provide an improved scissor hoist attachment for a pickup truck which is extremely rigid and resistant to twisting forces resulting from unbalanced loading and which permits a heavier payload to be lifted than prior art devices.

Other objects and features of the invention will become apparent by reference to the following specification and to the drawings.

Figure 1:
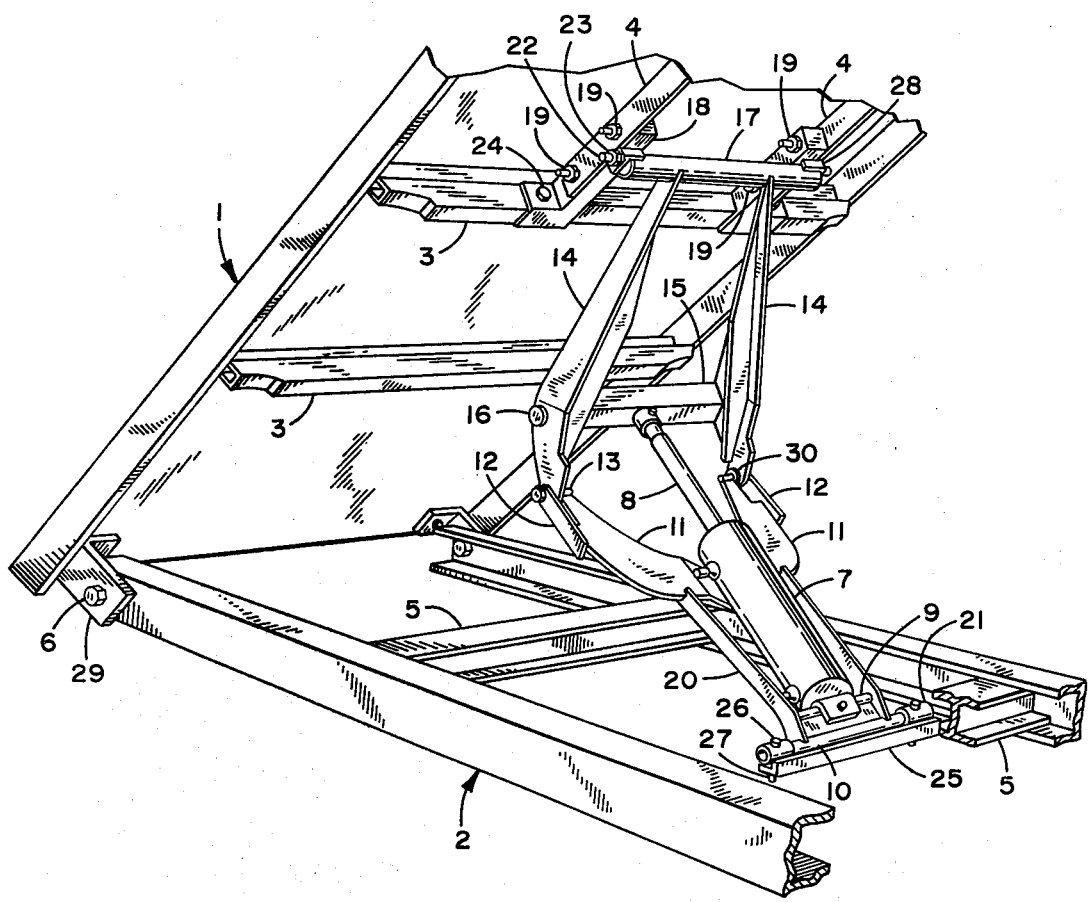
FIG. 1 is a detailed perspective view of a pickup truck hoist embodying the present invention installed on a tilting bed truck wherein the truck bed is raised relative to the truck frame.

Referring to the drawings, a typical installation of a pickup truck hoist embodying the present invention is shown. The hoist is installed between pickup truck hauling bed 1 and pickup truck frame 2 with hinges 29 and bolts or pins 6 permitting relative rotation between the bed 1 and frame 2.

The truck bed 1 includes support elements 3 and the truck frame 2 includes support elements 5.

The hoist is attached to the truck bed 1 by means of nuts 19 and bolts 24 coacting with support elements 3 and brackets or mounting elements 4 and 18 and nuts 23 which retain bolt 22 to flanges 28.

The hoist is attached to the truck frame by means of nuts 26 and bolts 27 which coact with support elements 5, sleeve bearing elements 21 and bracket or mounting element 25.

The scissors hoist includes a top frame and a bottom frame.

The hoist top frame which is tapered includes elongate longitudinally extending side plates 14 which are tapered toward each other at one end and connected by tube 17 which pivots on bolt or rod 22. The side plates 14 are shown with inwardly extending webs which are provided for strength.

Figure 2:
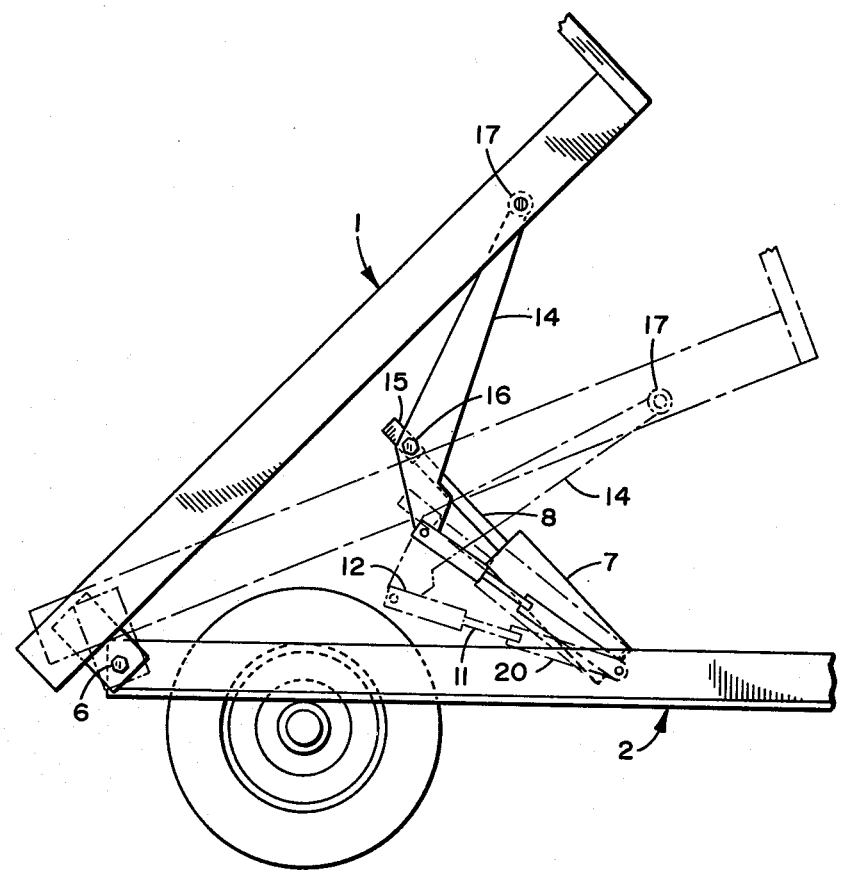
FIG. 2 is a side view showing the pickup truck hoist of the subject invention in a full elevated position in solid lines and in a partially elevated position in broken lines.
Figure 3:
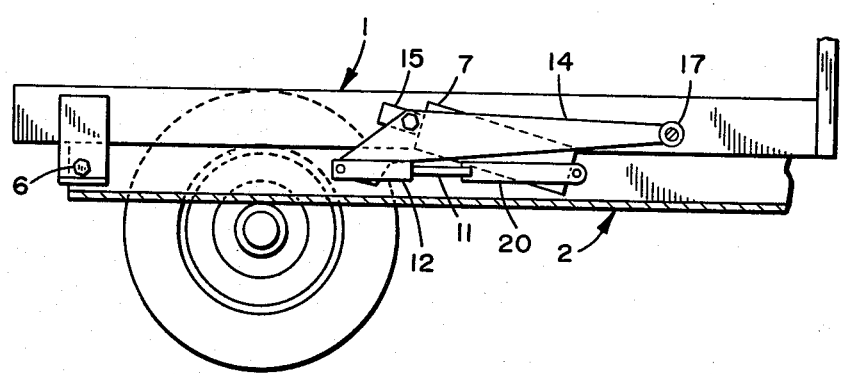
FIG. 3 is a side view showing the pickup truck hoist of the subject invention in horizontal or retracted position.

The hoist bottom frame which is tapered includes a pair of elongate longitudinally extending side plates 20 which are tapered toward each other at one end and connected at that end by pivot rod 10 and mounting structure 9. The pivot rod or tube 10 pivotally mounts in sleeve bearing elements 21. The hoist bottom frame also includes U-shaped element or spreader plate 11 which connects the side plates 20 at their other end where they are tapered away from each other. The U-shaped element 11 is pivotally connected at the ends of its prongs to the other ends of the side plates 14 where they are tapered away from each other by means of hinge pins 13 and washers 30. The U-shaped element 11 has a trough at the bottom of the U (as shown in FIG. 1 but not in FIGS. 2 and 3) to accommodate the cylinder 7. The U-shaped element or spreader plate 11 is provided with outside tension members 12 for additional strength.

Yoke 15 is pivotally mounted between side plates 14 by pins or bolts 16.

The truck bed 1 is lowered and raised by a variable length actuator such as piston rod 8 which is connected to the yoke 15 and cylinder 7 which is connected to the mounting structure 9. Control of the variable length actuator is normally from the truck cab by a completely conventional hydraulic control system, not shown. The variable length actuator exerts a lifting force between the truck frame 2 and the yoke 15 when said actuator means is extended so that said truck bed 1 is tilted rearwardly and said variable length actuator means retracts the truck bed 1 when said actuator mean is retracted to achieve horizontal position.

What I claim as my invention and desire to secure by Letters Patent of the United States is:

1. A scissor hoist attachment for converting a fixed bed truck with a passenger cab and hauling bed supported on a frame to a tilting bed truck where the truck bed may be rotated from a horizontal to a tilt position, such attachment permitting the truck cab and bed, when the bed is in the horizontal position, to assume the same relative relationship as before the conversion, comprising:

at least two hinges fixedly attached between the underside of the hauling bed and the rear of the truck frame to permit relative rotation between the hauling bed and frame, a generally tapered bottom frame including a pair of elongate longitudinally extending side plates tapered toward each other at one end and means connected to the side plates at such end for pivotally connecting the side plates to the truck frame and a generally U-shaped element connected between each longitudinally extending side plate at their other end where they are tapered away from each other, said U-shaped element being wider at the bottom of the U and narrower towards the ends of the prongs, a generally tapered top frame including a pair of elongate longitudinally extending side plates tapered toward each other at one end and means connected to the side plates at such end for pivotally connecting the side plates to the truck hauling bed and means for pivotally connecting the top frame side plates at their other ends where they are tapered away from each other to the ends of the prongs of the U-shaped element of the bottom frame, a yoke pivotally connected between the top frame side plates, a variable length actuator means interconnected between the yoke and the means for pivotally connecting the bottom frame side plates to the truck frame, said variable length actuator means exerting a lifting force between the truck frame and the yoke when said actuator means is extended so that said truck bed is tilted rearwardly and said variable length actuator means retracting the truck bed when said actuator means is retracted.

2. A scissor hoist attachment as described in claim 1 in which the means for connecting the hoist attachment to the truck frame and truck bed are readily detachable.

3. A scissor hoist attachment as described in claim 2 in which the U-shaped element of the bottom frame forms a trough at the bottom of the U to accommodate the actuator means when the truck bed is retracted.

4. A scissor hoist attachment as described in claim 3 including tension members for extra strength connected to the outside of the prongs of the U-shaped element of the bottom frame and at the points of pivotal connection between the bottom frame and the top frame.

5. A scissor hoist attachment as described in claim 4 in which the side plates of the top frame are formed with inwardly extending webs for strength.

* * * * *